Oct. 10, 1939.　　　F. C. WILSON　　　2,175,333
GREASE PAN FOR GRILLS
Original Filed Aug. 21, 1936

Inventor:
Frank C. Wilson
By: Tefft & Tefft
Att'ys.

Patented Oct. 10, 1939

2,175,333

UNITED STATES PATENT OFFICE 2,175,333

GREASE PAN FOR GRILLS

Frank C. Wilson, Bloomington, Ill., assignor to Servrite Mfg. Co., Bloomington, Ill., a corporation of Illinois Original application August 21, 1936, Serial No. 97,112, now Patent No. 2,156,557, dated May 2, 1939. Divided and this application March 18, 1939, Serial No. 262,643

4 Claims. (Cl. 53—5)

This invention relates to cooking grills and particularly to a novel arrangement of a grease pan for such grills. This is a divisional application of my co-pending application 97,112 for an Electric grill.

The ordinary grill is usually located out of sight of the restaurant customers with ample provision for removing the smoke and odors usually resulting from the grilling process. Although the restaurateur may be meticulous in his methods there are often questions in the minds of the customers regarding the cleanliness and care exercised in the preparation of the food.

Modern merchandising of food stuffs indicates the wisdom of displaying the complete restaurant service in plain view of the customers. This system of restaurant service requires special devices for the display and preparation of the foods.

It is the particular object of this invention to provide a grease pan for a grill which will permit effective cleaning of the entire surface with a minimum of spillage and wherein the grease or refuse material may be stored out of sight behind the grill.

Another object is to provide a grease pan for a grill which is quickly and easily detachable for emptying and cleaning.

Other objects and benefits will be disclosed by the following descriptions and drawing in which.

Figures 1, 2:
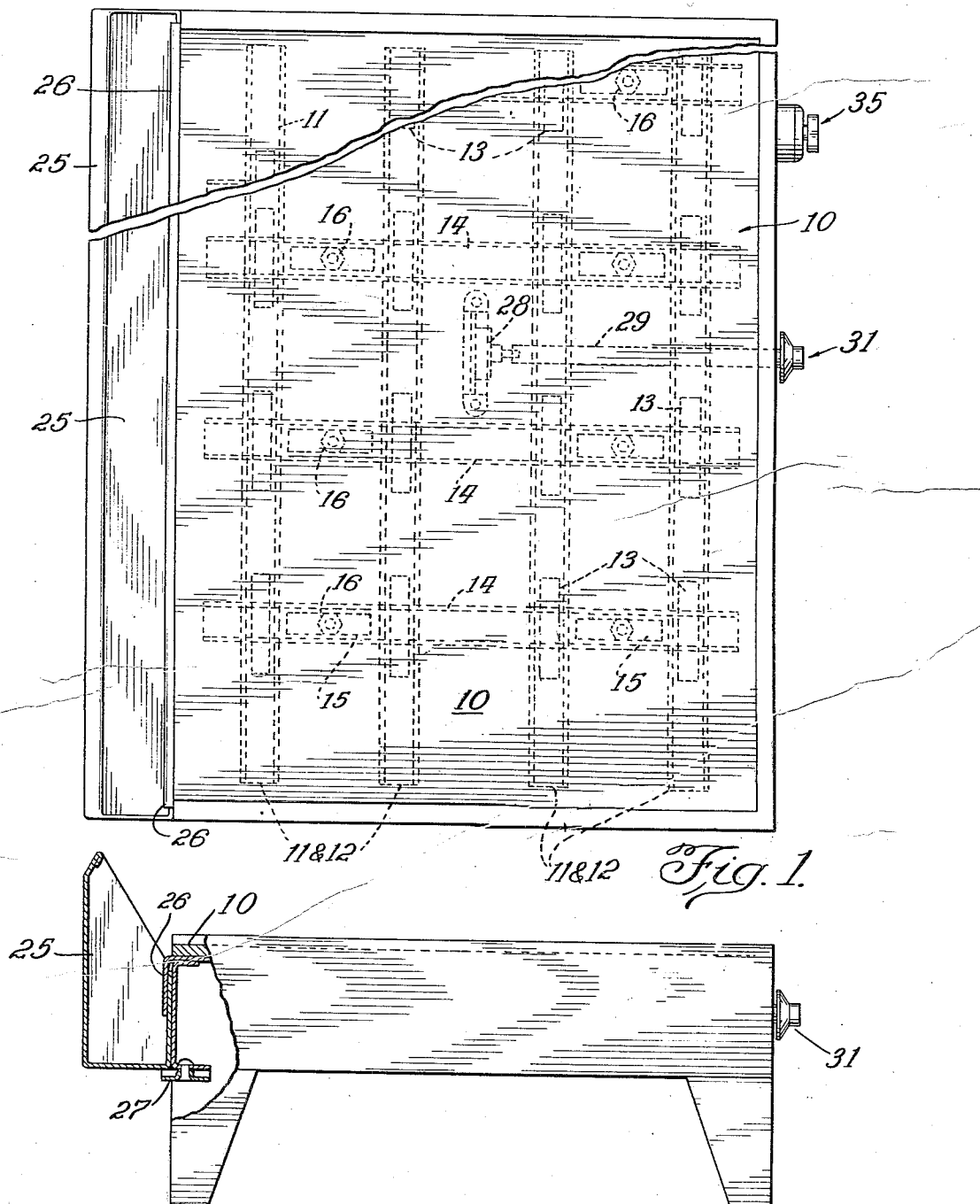
Fig. 1 is a plan view of an electric grill with grease pan attached. This view is exactly similar to Fig. 1 of my co-pending application Serial Number 97,112, filed August 21, 1936.
Fig. 2 is an end elevation view with a portion of the side broken away to disclose the mounting of the grease or waste pan. This is a similar view to Fig. 3 of my co-pending application.

I show the grease pan mounted on an electric grill, but it will be understood that this is merely a preferred embodiment of my invention and that the same structure of grease pan is adaptable to be mounted on any grill or hot plate heated by any conventional means.

The grill plate 10 is heated by blanket type heating elements 11 which are tightly clamped against the grill plate 10 by channel clamping strips 12 which completely cover the heating elements. The clamp channels 12 are in turn held down by bridge clamps 13 and cross channel clamps 14 and bridge clamps 15 by stud bolts 16 tapped into the grill plate 10.

The heat to the grill plate 10 is controlled by a conventional bimetallic thermostat 28 through an extension shaft 29 attached to the graduated thermostat knob 31.

An off and on control switch 35 is mounted beside the thermostat knob 31 to shut off or turn on the current to the grill.

As best shown in Fig. 2, the grease pan 25 is attached to the back wall of the frame by means of an overhanging angle 26 enveloping the inner wall of the grease pan. The pan 25 is held in position as shown by turn buttons 27 or any other similar fastening means. It will be appreciated that by revolving the turn button 27 at right angles to the position shown, the grease pan 25 can be detached by sliding it downward from behind the overhanging angle 26. The pan can then be removed and effectively cleaned.

It will be appreciated that the grease pan extending along the entire back edge of the grill and supported under the overhanging angle 26, the entire surface of the grill may be scraped backwards into the pan with a minimum of danger of spilling grease or refuse material. It will further be appreciated that the pan being rather deep and in back of the grill, this refuse matter will be completely hidden from view.

Further, it will be understood that although I have shown a preferred embodiment of my invention, I do not desire to be limited by the particular structure shown except as such limitation is imposed by the following claims.

I claim:

1. In a device of the kind specified, the combination with a grill plate, of a drip pan extending across the rear of said plate and having a front vertical wall disposed underneath an edge portion of said plate and a rear wall opposed to, spaced from and projecting appreciably above the level of said edge of said plate, said rear wall equipped with an upper end portion projecting forwardly of the body portion thereof.

2. In a device of the kind specified, the combination with a grill plate, of a drip pan extending substantially across the rear of said plate and having a front vertical wall disposed underneath an edge portion of said plate and a rear wall opposed to, spaced from and projecting appreciably above the level of said edge of said plate, said rear wall equipped with an upper end portion projecting forwardly of the body portion thereof, said pan being equipped with side walls secured to the ends of the front and rear walls thereof throughout the length of the latter and presenting exposed upwardly and rearwardly inclined edge portions extending from the upper edge of the front wall to the upper edge of the rear wall thereof.

3. In a device of the kind specified, the combination with a grill plate, of a drip pan extending across the rear of said plate and having a front vertical wall disposed underneath an edge portion of said plate and a rear wall opposed to, spaced from and projecting appreciably above the level of said edge of said plate, and means disposed on the device below said edge of said plate for detachably engaging said pan with said device.

4. In a device of the kind specified, the combination with a grill plate, of a drip pan extending substantially across the rear of said plate and having a front vertical wall disposed underneath an edge portion of said plate and a rear wall opposed to, spaced from and projecting appreciably above the level of said edge of said plate, and means disposed on the device below said edge of said plate for detachably engaging said pan with said device, said means comprising a downwardly projecting member on said device overlapping the inner face of the upper end portion of the front wall of said pan, and manually operable devices on said device movable from a drip pan supporting to non-supporting position.

FRANK C. WILSON.